No. 895,818. PATENTED AUG. 11, 1908.
E. C. WAGNER & J. D. A. JOHNSON.
MILK STRAINER.
APPLICATION FILED SEPT. 7, 1907.
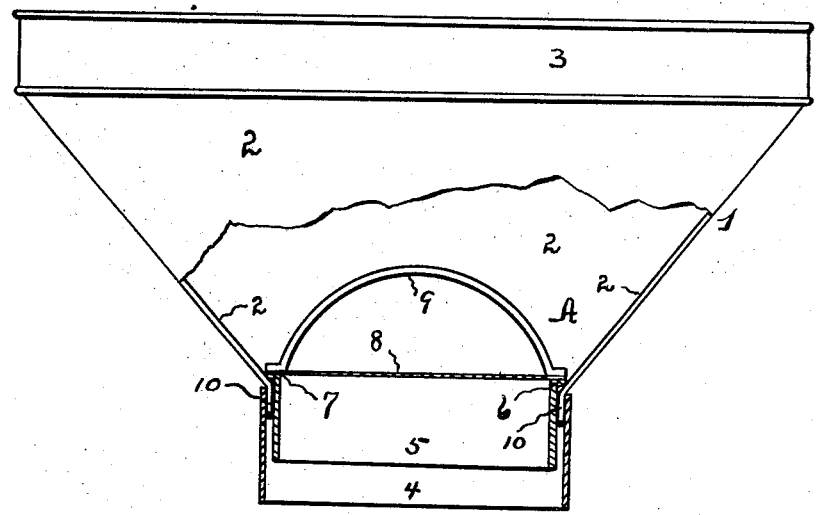
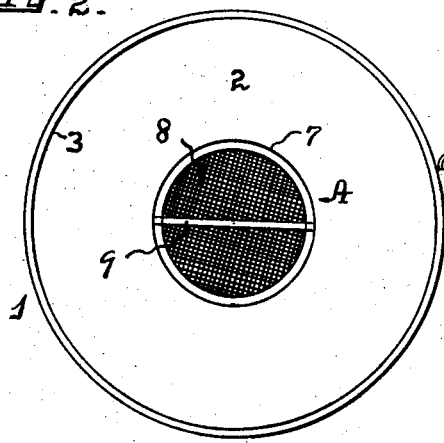
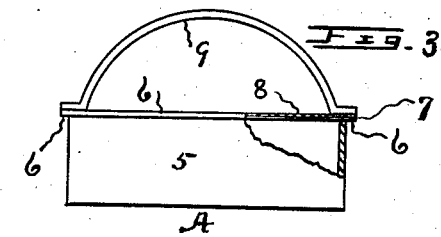
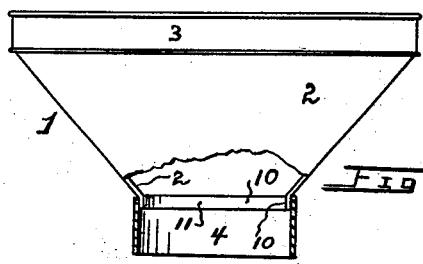
Witnesses
George W. Covell.
J. B. Sedgwick.
Inventors:
Edward C. Wagner and
John D. A. Johnson,
By Hiram A. Sturges, Attorney

UNITED STATES PATENT OFFICE.

EDWARD C. WAGNER, OF ARAPAHOE, AND JOHN D. A. JOHNSON, OF OMAHA, NEBRASKA.

MILK-STRAINER.

No. 895,818.  Specification of Letters Patent.  Patented Aug. 11, 1908.

Application filed September 7, 1907. Serial No. 391,784.

*To all whom it may concern:*

Be it known that we, EDWARD C. WAGNER and JOHN D. A. JOHNSON, citizens of the United States, residing, respectively, at Arapahoe, in the county of Furnas and State of Nebraska, and Omaha, in the county of Douglas and State of Nebraska, have invented certain new and useful Improvements in Milk-Strainers, of which the following is a specification.

This invention relates to improvements in milk strainers and has reference to a construction which will permit a separation of the filter from the body of the receptacle.

Broadly considered, the invention comprises a receptacle with an open exit port formed therein, and a removable closure for the port, the removable closure being provided with a filter.

Heretofore, the wire mesh or gauze has been soldered upon milk strainers, and in operation, as is well known, this gauze, mesh or filter collects foreign substances and is a lodgment for many impurities contained in the milk, and the wire mesh requires boiling and cleaning upon every occasion of its use; and frequently it requires repairing at a tin shop, resulting in loss of use of the strainer; also on account of the large size of the strainer, the necessary boiling is not convenient. We provide a separate holder or frame for the wire mesh or filter, and this frame may be readily inserted in the exit port or narrowed part of the strainer-body, or may be removed therefrom and may be easily cleaned or boiled. As the mesh-frame is quite inexpensive, several of them are generally provided and used in connection with one receptacle. They are easily cleaned because they are of small size and may be conveniently boiled, and the mesh or gauze is accessible for cleaning purposes; and if repairs are needed such repair work does not interfere or cause inconvenience.

The novel features of the invention are fully described herein, pointed out by the claims and illustrated by the drawing, wherein,—

Figure 1 is a vertical, side view of a strainer embodying our invention, the wall of the receptacle being partly broken away to show sectioned parts. Fig. 2 is a plan view, somewhat reduced, of the invention. Fig. 3 is a side view, partly in section, of the filter-frame. Fig. 4 is a reduced view, somewhat similar to that shown in Fig. 1, the filter-frame being removed.

Referring now to the drawing for a more particular description, numeral 1 indicates a receptacle with a circular containing-wall 2 formed downwardly convergent from rim 3, and provided with a circular hollow base 4 soldered upon the containing-wall, these parts being common to milk strainers.

We construct the mesh-frame A, its principal part being the longitudinally-apertured cylinder or sleeve 5 (Fig. 3) having upon its upper end or edge the flange or annular projection 6 extending laterally and outwardly from the plane of the sleeve, and upon the upper side 7 of flange 6 is secured the perforated web wire gauze or filter 8, preferably soldered thereon; and we provide any convenient handle, as bail or loop 9 extending above the filter and having its ends secured upon the outer edge of the filter, as by soldering.

The preferred construction with reference to the receptacle, is to form a wall 10 of a less length than the walls either of base 4 or sleeve 5 (Fig. 4), as· by crimping the lower terminal of wall 2, so that wall 10, thus formed as an annular vertical rim, will be disposed parallel with and may be soldered upon the inner surface of the wall of base 4.

According to the foregoing description, sleeve 5, filter 8 and the bail are secured unitedly; the sleeve operates as a frame for the mesh or filter; flange 6 supplies a surface upon which the circular edge of the mesh or gauze may be supported and soldered; it also supports the ends of the bail; and when in contact with wall 2 said flange prevents passage of milk between contacting parts.

Frame A may be placed in the operative position shown in Figs. 1 and 2, and when thus placed the sleeve makes reliable contact with the annular wall 10 so that, when in use, the contents of the receptacle will not escape therebetween. As is apparent, the mesh-frame may be removed for cleaning by manually raising the bail or by pressing upward upon the lower end of sleeve 5; the annular projection 6 contacts with wall 2 and thereby operates as a stop-lug to prevent the sleeve from passing the exit-port 11 of the receptacle, as when inserting frame A for operative purposes.

For using the device, the filter-frame, from the interior of the receptacle, is placed so that the wall of sleeve 5 engages wall 10, thereby forming the annular recess 12 between the respective walls of base 4 and sleeve 5; by pressing downward upon the handle or bail, the sleeve will have a downward sliding movement while in contact with wall 10; this sliding movement is continued until flange 6 engages the containing-wall 2, and during the operation of straining, the milk can pass only through filter 8. The provision of recess 12 allows a reliable contact of sleeve 5 with the narrow annular wall 10 of containing-wall 2, this contact being otherwise prevented when the lower part of sleeve becomes indented or bent, as often happens, and this construction facilitates insertion or removal of frame A. After use, strainer-frame A may be removed for cleaning by raising bail 9, as already described.

What we claim as our invention is,—

1. A milk strainer, comprising a receptacle having a containing wall formed with an exit port with a downwardly-extending, annular rim; an annular base disposed parallel with and secured outwardly of and having a greater length than the downwardly-extending, annular rim of said containing - wall; a filter having an annular sleeve of greater length than the downwardly-extending, annular rim of the containing - wall of said receptacle; said filter adapted to have a seating within the exit port of said containing-wall of the receptacle to cause a contact of the downwardly-extending, annular rim of said containing-wall with a part of said annular sleeve and to form a recess between the wall of the annular sleeve of said filter and the wall of said annular base.

2. A milk strainer, comprising a receptacle having a containing-wall formed with an exit port with a downwardly-extending, annular rim; an annular base disposed parallel with and secured outwardly of and having a greater length than the downwardly-extending, annular rim of said containing - wall; a filter having an annular sleeve of greater length than the downwardly-extending, annular rim of the containing-wall of said receptacle and provided with an annular rim formed to project transversely from its outer surface; said filter adapted to have a seating within the exit port of said containing-wall of the receptacle to cause a contact of the downwardly-extending, annular rim of said containing-wall with a part of said annular sleeve, and to form a recess between the wall of the annular sleeve of said filter and the wall of said annular base, and to cause a contact of the annular rim of the sleeve of said filter with the containing-wall of said receptacle.

3. In a device of the character described, the combination with a funnel top having a short vertical annular neck at its lower end, of a sleeve depending from said neck and secured thereto upon the outside thereof, said sleeve extending some distance below the lower edge of said neck, a strainer comprising a sleeve adapted to slide through said neck and to depend into said first named sleeve, the last named sleeve having an outturned flange at its upper end to limit its downward movement, a screen which covers the top of the first named sleeve, said screen being fixedly secured to said sleeve, and a handle which extends from one side of the sleeve to the other to provide means for withdrawing the sleeve from the neck, said neck serving to space the last named sleeve from the first named sleeve.

In testimony whereof we have affixed our signatures in presence of two witnesses.

EDWARD C. WAGNER.
JOHN D. A. JOHNSON.

Witnesses as to Edward C. Wagner:
F. W. BELLAMY,
CHAS. A. PATTERSON.

Witnesses as to John D. A. Johnson:
HIRAM A. STURGES,
GEORGE W. COVELL.